May 23, 1933.　　　J. M. LE GRAND　　　1,910,703
THERMAL INSULATION
Filed Aug. 17, 1932　　　6 Sheets-Sheet 1

Inventor:
Joseph M. Le Grand
By Rector, Hibben, Davis & Macauley Attys.

Inventor
Joseph M. Le Grand

May 23, 1933.  J. M. LE GRAND  1,910,703
THERMAL INSULATION
Filed Aug. 17, 1932   6 Sheets-Sheet 5

Inventor
Joseph M. Le Grand
By Rector, Hibben, Davis & Macauley
Attys.

Patented May 23, 1933

1,910,703

UNITED STATES PATENT OFFICE

JOSEPH M. LE GRAND, OF CHICAGO, ILLINOIS

THERMAL INSULATION

Application filed August 17, 1932. Serial No. 629,089.

This invention relates to thermal insulation and it has to do particularly with a novel heat insulating system adapted for reducing to the minimum the transfer of heat through a space bounded by relatively higher and lower temperature areas.

A principal object of my invention is to provide an all-metal heat insulating means of a character adapted to provide near-maximum insulation efficiency and which is exceptionally simple in construction, is inexpensive to manufacture, is readily adaptable with ease to practically every device or installation where heat insulation is desired, is strong and durable, is of low specific heat, is fireproof, is not affected by moisture and vapor, and is proof against vermin, insects, rodents, bacteria and various gases.

Another object is to provide a system of the foregoing character, which comprises one or a group of substantially parallel spaced metallic sheets or surfaces arranged in substantially parallel, spaced relation to the wall surfaces defining the space to be insulated in such a manner that there are provided a plurality of disconnected and unobstructed air film areas extending substantially throughout the length and width of each such sheet or surface.

A further object of my invention is to provide a thermal insulation arrangement including one or more spaced metallic surfaces or sheets, the metallurgical and physical characteristics and the spacing of which are predetermined by the radiation frequency derived from the temperature differences involved with respect to their position in the absolute temperature scale. To this end, my invention contemplates the use of a metallic material having high reflection and low emission values at the radiation frequency predominating and spaced in such a manner with respect to the higher temperature side of the space to be insulated as to gain substantially its full value in the foregoing respects as well as to provide within such space an air film condition which, taken together with the low emission value and high reflectivity of the metallic surfaces or sheets, reduces to the minimum the transfer of heat by conduction, convection and radiation. In carrying out this object and feature, my invention further contemplates, for highest insulation efficiency, a predetermined positioning of the metallic sheet or surface or surfaces with respect to the maintenance of thermal equilibrium within the space to be insulated. More particularly, in an insulating unit comprised of a single metallic sheet, the sheet shall, preferably, be located approximately at the so-called "temperature equilibrium" or "temperature balance" or "thermal fulcrum" point within the space to be insulated; and, where an insulating unit comprised of a plurality of metallic sheets is employed, the central plane of such unit or the geometrical center of the mass shall, preferably, be located approximately at this "thermal equilibrium" or "thermal fulcrum" point.

Still another object of my invention is to provide an arrangement of the foregoing character wherein the metallic sheet or sheets or surfaces are electrically grounded preventing electrolytic decomposition of the same from the source of thermo-electrically propagated current, and wherein the metallic sheets or surfaces are brought to the same electrical polarity, thereby aiding in the prevention of transmission of heat through the agency of electric molecular vibrations through the air films between such sheets or surfaces.

An additional object is to provide for the utilization of dull, non-bright metallic sheets or surfaces, which have low reflectivity and high emissivity values within the limits of the visible spectrum, for the establishment of thermal insulation condition, thereby enabling the use of quite inexpensive materials in the attainment of high insulation efficiency in ordinary thermal insulation environments.

Still another object is to provide spaced metallic sheets having their surfaces deformed in such a manner that slight angles are formed with a normal plane of the same, thereby establishing an increased insulation value, preventing the propagation of sound waves by vibration of the insulation sheets and the walls of the space to be insulated, and, at the same time, stiffening the sheets to enable the use of comparatively thin and normally flexible metallic sheets.

Additional objects are: to eliminate the use of physical means or material as an insulation medium, per se; to provide high insulation value by the harnessing in a new and novel manner of heretofore unapplied phenomena which exist and constitute active elements involved in the mechanism of heat transfer; to eliminate objectionable features of all prior known insulating materials; to provide for the propagation of, as well as the effective utilization of, within the space to be insulated, so-called "laminar flow" or "theoretical flow" or non-turbulent gas films which have maximum utility to block the transmission of heat by conduction and convection, and to provide an arrangement wherein a plurality of substantially parallel "laminar flow" gas films are formed and which are so related as to substantially approximately abut each other and substantially fill the space to be insulated and thereby substantially eliminating turbulent flow films and consequent convection heat flow; to provide a universally adaptable insulating unit of novel form, comprising one or more spaced metallic sheets embodying the foregoing features and characteristics, which unit is so constructed and related to the space in which it is mounted that it is expansible and contractible, it may be mounted without separate fastening means and it provides a plurality of spaces having their edges sealed throughout to prevent gas film flow communication between spaces on the opposite sides of the sheet or sheets; to provide an arrangement of the foregoing character whereby the full area of the space to be insulated is insulated to a substantially uniform degree; and to provide a heat insulation system embodying a plurality of heat-transmission blocking agencies inclusive of all the foregoing features, which are co-ordinated so as to cooperatively produce as a total result a higher degree of insulation efficiency than has heretofore, to my knowledge, been attained.

Other objects and advantages will become apparent as this description progresses and by reference to the drawings illustrating embodiments of my invention and wherein,—

It is to be understood that while I have chosen to illustrate my invention in its adaptation to a household refrigerator, I do not desire to be limited to such use, since it is obvious that it has utility in every environment where thermal insulation is desired; for example, without limiting the generality, ice boxes, refrigerator cars, cold storage vaults, hot water heaters, boilers, furnaces, buildings, etc.

In order to facilitate understanding of the several factors and features of my invention and the coordination of the same with respect to the phenomena involved in the mechanism of heat transfer, I will refer to the several principles and discoveries which enter thereinto before referring specifically to the illustrated embodiment thereof.

It is well known that heat may be transmitted from a point of higher temperature to a point of lower temperature by conduction, convection and radiation. Heat insulation is, broadly speaking, the prevention or retardation of flow or transmission of heat from one temperature level to another, and, obviously, highest obtainable efficiency would lie in complete insulation against or blocking of heat transmission by all of the foregoing agencies. In general, "conduction", as used in expressing an agency of heat transmission, consists of the molecular transmission of vibrations or motion between molecules; "convection" is the actual transportation of vibrating molecules by a fluid, or the like, from one point to another; and "radiation" is the transfer of energy from one point or source to another through the agency of a wave propagated in a fluid or in a theoretical postulation called "ether", the impingement of which upon material substances produces the phenomena of heat and light and other phenomena. "Heat" as referred to herein shall be considered as a form of energy or as a form of electro-magnetic molecular and intra-molecular vibrations of variable frequencies. The frequency of the radiant waves depends on the absolute temperature of the radiating source. By "frequency", as used herein, I mean the number of vibrations of a radiant wave through a given time, and by "wave length", I mean a linear distance expressing the length of the wave, as commonly used in optics. As temperature of a material mass is increased, molecular vibration within said mass is consequently correspondingly increased. Therefore, the radiant energy emitted or radiated from this mass is so closely related to the molecular vibrations within the mass that, as the temperature increases, the vibrations increasing with them cause the frequency of the emitted wave to become higher and the wave itself to be shorter, and vice versa. There is, therefore, a direct relation between the temperature of a material body, such as metal surfaces, and the wave length or frequency of the emitted energy.

In the transfer of heat by radiation the intensity and the amount transmitted or transferred is governed by several factors, some of which are the source of radiation, its frequency or wave-length, the physical and mechanical properties of the surface upon which the radiation is impinged, and the diathermancy of the matter through which the energy passes in the form of radiation. These relations appear to vary with each other, but, in general, the diathermancy of the matter varies with the wave length or frequency, most solid bodies being only very slightly diathermanous to the longer wave length (or lower frequency) but increasing in diathermancy with an increase in frequency (and corresponding decrease in wave length) as, for example, the well-known penetrating powers of the X-ray which are of extremely short wave length and high frequency. I have discovered that variations relatively similar to the foregoing exist in the emissivity of various metallic surfaces and the chemical and physical structure of such emitting and absorbing surfaces as the frequency or wave length of the radiation is varied and I have applied this discovery to the end of obtaining a high degree of thermal insulation.

So-called radiant heat is a portion of the electro-magnetic spectrum as is light, but there is a difference in frequency and wavelength. It is well-known that bright, silver-like surfaces reflect a high percentage of visible light; and I am aware that attempts have been made heretofore to utilize this well-known principle for the blocking of transmission of radiant heat. In step with these prior efforts, bright surfaces, and in certain instances, very thin, bright metallic sheets or surfaces such, for example, as aluminum-foil or tin-foil, have been employed in attempting to prevent the transmission of radiant heat. But since the wave-length or frequency of visible light is different from radiant heat, the frequency of the former being higher and the wave length shorter, these prior attempts have been only partially successful. In other words, these prior-used bright sheets or surfaces insulate against radiant heat according to their ability to reflect visible light, which ability is short of that desired for high efficiency.

I have found that where the frequency at which the radiant heat is emitted is less (or the wave length is longer) than that of visible light (which is the case in practically all thermal insulation fields), high insulation value may be obtained by the use of dull-surface and non-bright metallic sheets or surfaces. By this I refer to metals which have a low degree of reflectivity within the visible spectrum and which, with decrease in frequency (and increase in wave length), increase in reflective ability with consequent decrease in emissivity. Commercial black steel, for example, which possesses these characteristics has been found to produce excellent results.

I have discovered that in the use of a single metallic sheet within the space to be insulated, material of the foregoing character may be employed with high efficiency if it is positioned at a predetermined point with respect to the higher temperature side of such space as determined by the predominating radiant heat frequency and, if two or more sheets of such material are employed, (preferably in unitary or group form) that the central plane or geometrical center of the group of such sheets may be similarly located to obtain similar insulating effects and values.

In order to arrive at the preferable spacing of the metallic sheets within the space to be insulated, certain factors, according to my invention, should be taken into consideration. The frequency, through the agency of the mean temperature difference between the higher and lower temperature areas, is of importance, as well as the degree of higher temperature and the degree of lower temperature with respect to their position in the absolute temperature scale. It is necessary to base these derivations of degrees of temperature from absolute zero, due to the fact that the mathematical derivations of these values are the result of exponents from absolute zero. In employing these factors to obtain the preferable position of the metallic sheet or sheets within the space to be insulated according to my invention, it is necessary to set up or determine a thermal balance or the state of thermal equilibrium between the surfaces defining the space to be insulated, with respect to the radiant transfer. By "thermal equilibrium" or "thermal balance", I mean that temperature or condition, within the space to be insulated, which is satisfied by the following equation in which $t_1$ is equal to the absolute temperature of the side of higher temperature, $t_3$ is equal to the absolute temperature of the side of lower temperature and $t_2$ is equal to the absolute temperature of that theoretical point or thermal fulcrum of heat transmission balance wherein thermal equilibrium is satisfied:

$$(t_1^4 - t_2^4) = (t_2^4 - t_3^4)$$

in which equation $t_2$ becomes equal to $$\sqrt[4]{\frac{t_1^4 + t_3^4}{2}}$$

Having thus obtained the thermal value of $t_2$, the placement relation of this point with respect to the higher and lower temperature areas is determined from the existing relationship with the above equation, which is expressed as follows, assuming that $y$ equals the distance between the theoretical point (which is at an absolute temperature of $t_2$) and the surface of higher temperature (or surface which is at an absolute temperature of $t_1$), and $x$ equals the distance between the side of higher temperature and the side of lower temperature:

$$\frac{y}{x-y} = (t_1 - t_2) \bigg/ (t_2 - t_3)$$

and in order to locate the fulcrum point (that point at $y$ distance from the higher temperature side of the space to be insulated) of the thermal equilibrium sought, this equation is further resolved into:

$$y = \left(\frac{t_1 - t_2}{t_1 - t_3}\right)x$$

Now referring to that part of my invention relating to insulation against the flow of heat through the agencies of conduction and convection, it is known that insulating films of air or gas are formed upon the surfaces of heated metallic sheets. These films have the ability to insulate against convection transfer of heat similarly to theoretical "still" or "dead" air, while at the same time having the normal ability of air as a gas to prevent the transfer of heat by conduction. The thickness of these films varies with the effective temperature, the same being a function of the absolute temperature of the surface on which it is formed, which, in turn, functions through the agencies of density, viscosity, specific gravity and velocity. This can be illustrated by the deflection of interferometer fringes when the edges of heated plates are photographed. I have heretofore and will hereinafter refer to these films as "laminar flow" films which are understood to be non-turbulent or theoretical flow films. Films of this character are established by the metallic sheets or surfaces which are also utilized for shielding against radiation, since these films are practically transparent to radiation. It is further within the contemplation of my invention, that the metallic sheets or surfaces be so spaced, with respect to each other and to the surfaces defining the space to be insulated, that the space to be insulated is substantially filled with these films; and I have discovered that, by correlating the spacing of the sheets according to the predominating radiation frequency, as above explained, the resultant effect is substantially the intended fulfilment of this ideal "laminar flow" film condition. This feature, together with the other features of my invention, results in very close approach to a complete blocking of heat transfer by the agencies of radiation, convection and conduction.

It is to be understood that while in the preferred application of my invention I utilize air as the medium for insulation against transfer of heat by conduction, other gases of still lower conductivity than air may be utilized without departing from my invention; such, for example, as carbon dioxide and other gases of similar nature which require to be confined.

Still further, I have discovered that, comparatively with respect to visible light, the intensity of heat radiated obliquely from a metal surface is proportional to the cosine of the angle with the normal and is therefore reduced in intensity; wherefore, as another feature of my invention, cooperating with the foregoing features to the end of highest insulation efficiency, I preferably provide the metallic sheets with surfaces angular with the normal. I have discovered that radiant heat obliquely emitted is polarized and is further reduced in intensity, adding increased insulating value. In addition to this, the deformation or provision of angular surfaces on the sheet, together (preferably, but not necessarily) with ribs or the like formed therein, enables me to employ comparatively thin metallic sheets in carrying out my invention, since such deformation adds stiffness and rigidity thereto by increasing the value of the moment of inertia of the section. This further prevents vibration of the sheet which would, if it should exist, be quite objectionable in use from wear, rapid break-down, and other standpoints; and, still further, the sheets thus stiffened effectively resist the impact of sound waves, tending to prevent their regeneration on the opposite sides of the sheet or sheets.

In the use of two or more metallic surfaces for the purposes hereinabove stated, they become electrically charged to a slight degree and, unless grounded together, are of different polarity, wherefore there is a molecular attraction acting within the fluid between the surfaces from the positive to the negative pole with resultant transfer of heat across the space between the sheets. However, according to my invention, the metallic sheets or surfaces are electrically grounded to each other, and a similar polarity is set up therein with an opposite molecular repulsion effect which eliminates additional heat transfer through the agency of conduction, with increased insulating value. This arrangement also prevents electrolytic decomposition of the sheets from the source of thermo-electrically propagated currents.

Referring now particularly to the embodiment of my invention illustrated in Figs. 1 to 6, inclusive, of the drawings, the refrigerator cabinet structure is of conventional form comprising an outer rectangularly shaped shell 20 and an inner, spaced and similarly shaped shell 21 defining a food compartment or low temperature chamber 22. These shells are supported in spaced relation by a plurality of horizontal members or girts 23 (Fig. 1) and vertical posts 24 (Fig. 3) which, together with the inner and outer shells 20, 21 define at the sides, top and bottom of the cabinet structure closed spaces 25$^a$, 25$^b$, 25$^c$, 25$^d$ and 25$^e$, respectively, adapted to be insulated against the transmission of heat from the area externally of the outer shell 20 to the food compartment 22. The front of the cabinet may be provided with an opening leading directly into the food chamber 22, which opening may be closed by a door comprised of spaced inner and outer shells 26, 27 supported in spaced relation by horizontal and vertical members 28, respectively, providing the space 25$^f$ to be insulated. The outer and inner shells 20, 21, 26, 27 are formed, preferably, of a metallic material but, it is to be understood that any suitable material may be employed without departing from my invention.

My invention has to do particularly with insulation against transmission of heat through the spaces between the inner and outer shells 20, 21, 26, 27 and a preferred mode of application of the same (Figs. 1 to 7, inclusive) will now be described. Within each of the spaces 25$^a$, 25$^b$, 25$^c$, 25$^d$, 25$^e$ and 25$^f$, I mount an insulating unit which in each instance is identical, except as for size variation, and only one such unit will be described in detail. Specifically, this unitary structure is comprised of two sheets of metal having a dull, non-bright surface, which metal, for example, takes the form of so-called commercial cold-rolled black steel having a comparatively hard and smooth surface. However, it is to be understood that other metals having similar characteristics may be employed, such metal being of that character having high reflectivity and low emissivity within the limits of frequencies (and wave lengths) falling within the range of the radiant heat emitted. I have found that excellent results may be accomplished with metallic sheets of approximately .006 inch in thickness, but it is to be understood that the thickness of this metal may be varied without departing from my invention.

In order to facilitate the adaptation of my invention to structures of the character shown in the drawings, and in fact, most every other form of structure embodying spaces to be insulated, the metallic sheets, where more than one sheet is employed, are grouped together as a unit bearing predetermined spaced relation with respect to each other and with respect to the wall surfaces defining the higher and lower temperature sides of the space to be insulated (herein sometimes referred to as "group spacing"). More particularly, as shown in the drawings, I may employ a unit 29 (Figs. 5, 6 and 7) comprising an outer metallic sheet 30 of the foregoing character having all of its several edges similarly formed to provide, in effect, a supporting and edge-seal head 30$^a$ of V-shape cross section and of such dimensions that the opposite sides of this head frictionally engage the opposite walls defining the space to be insulated with its apex abutting the edge closure surface (in this case the girts and posts 23 and 24) defining such spaces. In the illustrated embodiment of my invention, the shape of the head 30$^a$ is such as to afford flexibility of the same in lateral direction as well as in the plane of the sheet. The width of the head is slightly greater than the space receiving the same, and likewise the dimensions of the unit 29 as a whole are slightly greater than the space receiving the same, wherefore, when this unit is inserted in the space to be insulated, the head 30$^a$ is compressed or contracted laterally to grippingly engage the opposite walls of the space and is compressed or contracted in the plane of the sheet 30 by the engagement of the apex of the head with the adjacent surface so that the unit 29 is grippingly and yieldingly retained in predetermined position within its intended space. In this manner, the unit 29 may be applied without the use of separate fastening means which might, otherwise, tend to afford a path for heat conduction. This form of mounting also compensates for thermal expansion and contraction of the sheets as well as insuring that the sheet will be held firmly in place without rattling and other objectionable conditions which would exist should the same be or become loose. Still further, this arrangement affords readiness and ease in installation of the unit, as well as facilitating manufacture of the same to the end of exceedingly low cost.

Figure 5:
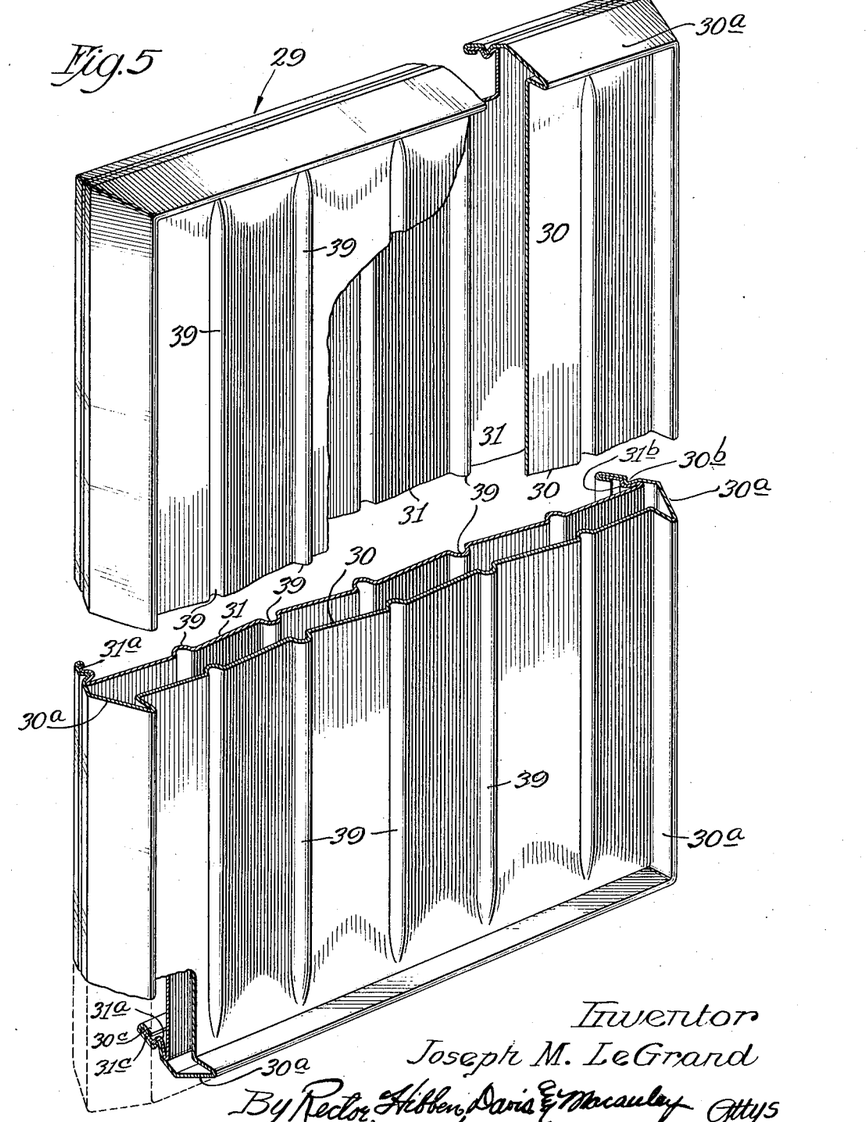
Fig. 5 is a separated, perspective view, partially in section, of the all-metal insulating unit shown in Figs. 1 to 4, inclusive.
Figure 6:
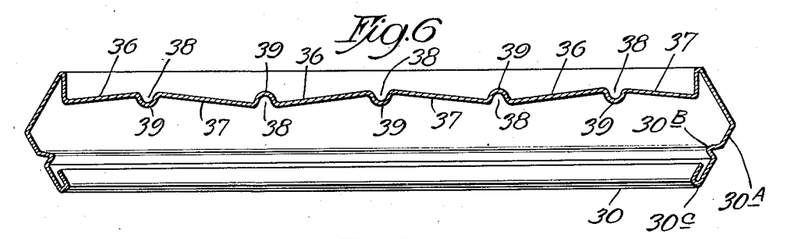
Fig. 6 is a sectional view in separated relation of one of the sheets comprising the unit of Fig. 5.
Figure 7:
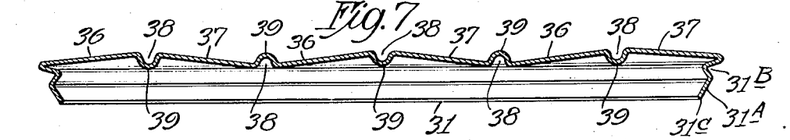
Fig. 7 is a sectional view in separated relation of another of the sheets comprising the unit of Fig. 5.

The insulating unit 29 further comprises a second metallic sheet 31 which is supported in nested relation by the edge head $30^a$ of the sheet 30 in spaced relation to the latter. This sheet 31 is provided with a completely circumscribing, laterally-extending edge flange $31^a$, which is beaded as at $31^b$ for interlocking engagement with a groove $30^b$ formed in the supporting sheet head $30^a$. The dimensions of the sheet 31 are, preferably, such with respect to the supporting head $30^a$ that its flange $31^a$ must be sprung slightly but snugly into detachable interlocking engagement with its supporting head so that this sheet is firmly and securely supported in predetermined spaced condition with respect to the sheet 30 without the addition of separate fastening means. To further effect this securement, the sheet head $30^a$ has its free edge $30^c$ slightly extended and turned back upon and over the free edge $31^c$ of the sheet edge flange $31^a$. By thus associating the sheets 30 and 31, they are electrically grounded to each other and to the metallic shells 20 and 21. The metallic sheets, or sheet as the case may be, are preferably, mounted in planes parallel with the plane of each other and with the planes of the space-defining walls 20, 21, 26 and 27. By arranging the sheets in this manner and by sealing the edges of the same unobstructed spaces, edge-sealed, and of substantially uniform depth throughout, are provided throughout the surfaces of the sheets.

It will be understood that the outer shell 20 represents the higher temperature side of the space to be insulated while the inner shell represents the lower temperature side of this space and, as hereinabove pointed out, the spacing of the sheets 30 and 31 with respect to each other and with respect to the shells 20 and 21 is of material importance from the standpoint of insulation value. The arrangement of these sheets with respect to these surfaces establishes an insulation system embodying the features and advantages already mentioned.

More particularly, the insulating unit (sheets 30 and 31) is spaced, with respect to the shell 20, a distance predetermined by the existent temperature difference and the predominating frequency (or wave length) of the radiant heat emitted, and this unit, preferably, should be so spaced that the center of the same or the center of the mass is at the point of thermal balance or thermal equilibrium within the space defined by the walls 20 and 21. In this manner, according to my discovery, the spaces between the sheet 30 and the outer shell 20, between the sheets 30 and 31 and between the sheet 31 and the inner shell 21 are approximately filled with so-called "laminar flow" films, the sheets 30 and 31 serving as shields against the transfer of heat by radiation while the "laminar flow" films serve to minimize the transfer of heat by conduction and convection.

Figure 14:
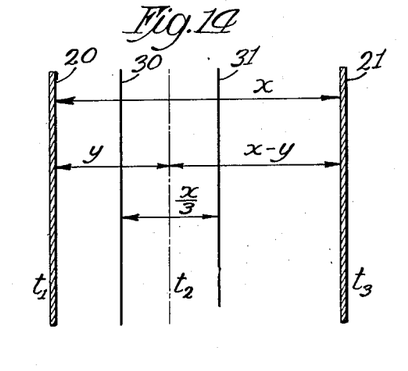
Fig. 14 is a diagrammatic view similar to Fig. 13, except illustrating the mechanics of the application of my invention to an insulating unit comprising two sheets of metal.

In carrying out my invention, I may first determine the thermal balance or thermal equilibrium between the walls 20 and 21. For example, assume the space between the walls 20 and 21 to be 2½″ in width, the temperature of the area externally of the wall 20 to be 100° F., and that it is desired to maintain a constant temperature of 50° F. in the food compartment 22, as diagrammatically illustrated in Fig. 14. In that case, using the basic equation hereinabove more particularly set forth, $t_1$ represents 100° F., $t_3$ represents 50° F., and solving for $t_2$ per the equation $$t_2 = \sqrt[4]{\frac{t_1^4 + t_3^4}{2}}$$

it is found that the temperature balance of such space or the temperature fulcrum thereof is approximately 76.8° F.

Having determined the thermal fulcrum, I may next determine the position at which the same lies with respect to the higher temperature wall or shell 20. More particularly, taking $x$ (the width of the space between the walls) as 2½″ (Fig. 14) and solving for $y$ per the equation $$y = \left(\frac{t_1 - t_2}{t_1 - t_3}\right)x$$

it is found that the distance $y$ (Fig. 14) is approximately $.46x''$ or $1.15''$. As I have pointed out hereinbefore, where two sheets are employed, I have discovered that the center line between such sheets, for excellent insulation purposes, may be located at this thermal fulcrum point; namely, 1.15″ from the wall 20 in the example given. I have also found by experimentation that in the use of two sheets the spacing between the same may, preferably, be equal approximately to one-third of the distance between the walls 20 and 21, as represented by $\frac{x}{3}$ in Fig. 14. However, it is to be understood that this dimensional relationship may be slightly varied with good results and without departing from my invention. In the example above given, the distance between the sheets 30 and 31 (Fig. 14) is approximately 0.83″; and, the sheets 30 and 31 will be disposed one-half of 0.83″ on the opposite sides of the thermal fulcrum point or approximately 0.415″ with respect to such point. Therefore, the plate 30 is spaced from the wall 20 a distance equal to 1.15″ minus 0.415″, or approximately 0.735″ so that the progressive spacing of the outer wall surface 20, the sheets 30 and 31 and the inner wall 21 is, respectively, approximately 0.735″, 0.830″ and 0.935″. It will be understood that this spacing, according to my invention, is approximately the ideal spacing for temperature and wall spacing conditions hereinabove set forth in this example; however, following the equations hereinabove given, these dimensions may be slightly varied upon the variation of the known factors involved in the example given, without departing from my invention.

Figure 13:
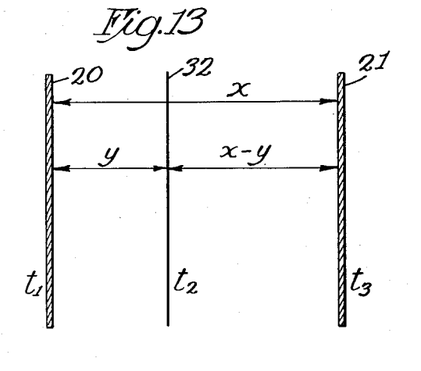
Fig. 13 is a diagrammatic view illustrating, in part, the mechanics of my invention as applied to an installation employing an insulating unit comprising a single metallic sheet.

I have found that highly efficient insulation results may be obtained with the use of two spaced metallic sheets when the space to be insulated is from a width of from 2″ to 3″; however, when the width of such space is 2″ or less, I have found that highly efficient results may be obtained with one sheet of metal, and where the total spacing is from 3″ to 4″ three properly spaced sheets may well serve the purpose. In Fig. 13, I have diagrammatically illustrated the adaptation of my invention to a single sheet installation. As there illustrated I assume that $x$ is 2 inches, that the temperature represented by $t_1$ (outside higher temperature) is 100° F. and that the temperature represented by $t_3$ (inside lower temperature) is 50° F. Now solving for $t_2$, we find that the temperature equilibrium is approximately 76.8° F. This value introduced in the equation hereinabove given, solving for the distance $y$, is found to be located at 0.92″ from the higher temperature side of the surface to be insulated. The single sheet 32, therefore, being located at this point is spaced 0.92″ from the higher temperature wall 20 and a distance of 1.08″ from the lower temperature wall 21.

Figure 15:
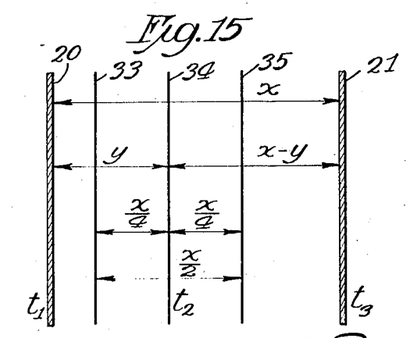
Fig. 15 is a view similar to Figs. 13 and 14 excepting showing one mode of application of my invention when an insulating unit comprising three sheets of metal are employed.

In Fig. 15, I have diagrammatically illustrated a three-sheet installation wherein $t_1$ represents in degrees F. the temperature of the higher temperature side of the space to be insulated; $t_3$ represents in degrees F. the temperature of the lower temperature side; $x$ equals the total distance between the sheets 20 and 21; $y$ equals the distance which the thermal balance or fulcrum point is located from the higher temperature side; $t_2$ represents the temperature in degrees F. of the thermal fulcrum; $\frac{x}{2}$ equals the total spacing between the inner and outer sheets 33 and 35 of the three-sheet group (comprising sheets 33, 34 and 35), and $\frac{x}{4}$ equals the spacing between the adjacent sheets 33, 34 and 35. Applying these values to the above equation for solution of the thermal fulcrum point and spacing (assuming $x$ to equal 3″, $t_1$ to represent in degrees F. a temperature of 100° and $t_3$ to represent in degrees F. a temperature of 50°), in solving for $t_2$ we find the temperature fulcrum or balance in degrees F. to be approximately 76.8°. I have found that in a three-sheet unit, the sheets may, preferably, be spaced equal distance apart within the unit and that the center sheet or the central plane of the group of sheets may, preferably, be located on the thermal fulcrum point. It is to be understood, however, that the dimensional relationships $\frac{x}{2}$ and $\frac{x}{4}$ are illustrative of spacing of sheets which gives highly efficient results but the same may be varied slightly without departing from my invention. Therefore, solving for the location of the thermal fulcrum 76.8° F., according to the equation hereinabove given it is located at approximately 1.38″ from the higher temperature wall 20, and the center sheet 34 of the three-sheet group is, preferably, placed at this position. Now solving for $\frac{x}{2}$ (Fig. 15), or the total width distance covered by three plates 33—35, we find that such distance is equal to 1½″ wherefore the distance 4 (Fig. 15) between the adjacent plates is 0.75″. Therefore, with the center sheet 34 placed at 1.38″ from the higher temperature side, the sheet 33 nearest the higher temperature side is spaced from that side 1.38″ minus 0.75″ or 0.63″, and the sheet 35 farthest from the higher temperature side is spaced from that side a distance equal to 1.38″ plus 0.75″ or 2.13″. Wherefore the progressive spacing between the higher temperature wall 20, the metallic sheets 33, 34 and 35 and the lower temperature wall 21 is 0.63″, 0.75″, 0.75″ and 0.87″.

As hereinabove mentioned, while I have obtained highly efficient insulation results by the spacings hereinbefore given by example, such spacings may be slightly varied without departing from my invention. For example, under ordinary temperature conditions, I have found that exceptionally good results may be obtained by positioning the thermal balance or fulcrum point within the space to be insulated at a distance from the higher temperature wall which falls within a dimensional range, the limits of which are between ½ and ⅓ of the distance between the wall surfaces defining the space to be insulated. If the spacing of this fulcrum point should be so varied, the relative spacing of the metallic sheet or sheets (where group spacing is employed) or surfaces should be followed with respect thereto as hereinabove described. In other words, I have found that exceptionally good results may be obtained by positioning a single sheet or the central plane of a group of sheets in the space to be insulated at a point which falls within the dimensional limits of less than ½ and more than ⅓ of the width of such space.

As I have already pointed out hereinbefore, an increased insulating value is established by deformation of the metallic sheets. In carrying out this feature (Figs. 1 to 7, inclusive) the surfaces of each sheet are so deformed as to provide a series of successive surfaces 36 and 37 inclined with respect to the normal, the adjacent of which surfaces are extended in oppositely directed intersecting planes in one direction across the sheets. For example, the sheet surfaces 36 and 37 are disposed in oppositely directed planes which intersect substantially at the point 38. Furthermore, these sheets are each provided at the point of intersection of the angular surfaces with ribs 39 which are formed to lie wholly within the confines of the apex portion of the intersecting planes of the surfaces 36 and 37. The purpose of so arranging and forming these ribs 39 is to avoid the extension of the metallic surface nearer to the adjacent walls 20 and 21, thereby guarding against any tendency toward transmission of heat across the point adjacent the ribs by virtue of the projection of such ribs. For example, I predetermine the spacing of the sheets to be a certain dimension with respect to the walls defining the space to be insulated, and though I provide the ribs 39 in the manner set forth, I do not disturb that predetermined relationship. In view of the fact that the intersection of the planes of the surfaces 36 and 37 are in an offset relation, the ribs 39 are, therefore, alternately turned in opposite directions to fall within the foregoing requirements, and the surface of each rib does not project substantially beyond the normal plane of the sheets. The mode of functioning of the sheet deformation has already been pointed out in connection with the general explanation of my invention, and I believe that the same will be clearly understood, without further explanation, in its application to the particular structure which I have selected to illustrate my invention. I may add that where the spaces to be insulated are arranged in a vertical position, for example, the spaces 25$^a$, 25$^b$ at the sides of the refrigerator cabinet of Figs. 1 to 4, inclusive, I preferably form the angular sheet surfaces and the ribs 39 in such a way that the ribs extend vertically; thereby, positively guarding against possible disturbances in the "laminar flow" films in the space to be insulated which, if it should occur, might result in a certain amount of turbulent flow and transfer of heat by convection.

Figures 10, 11:
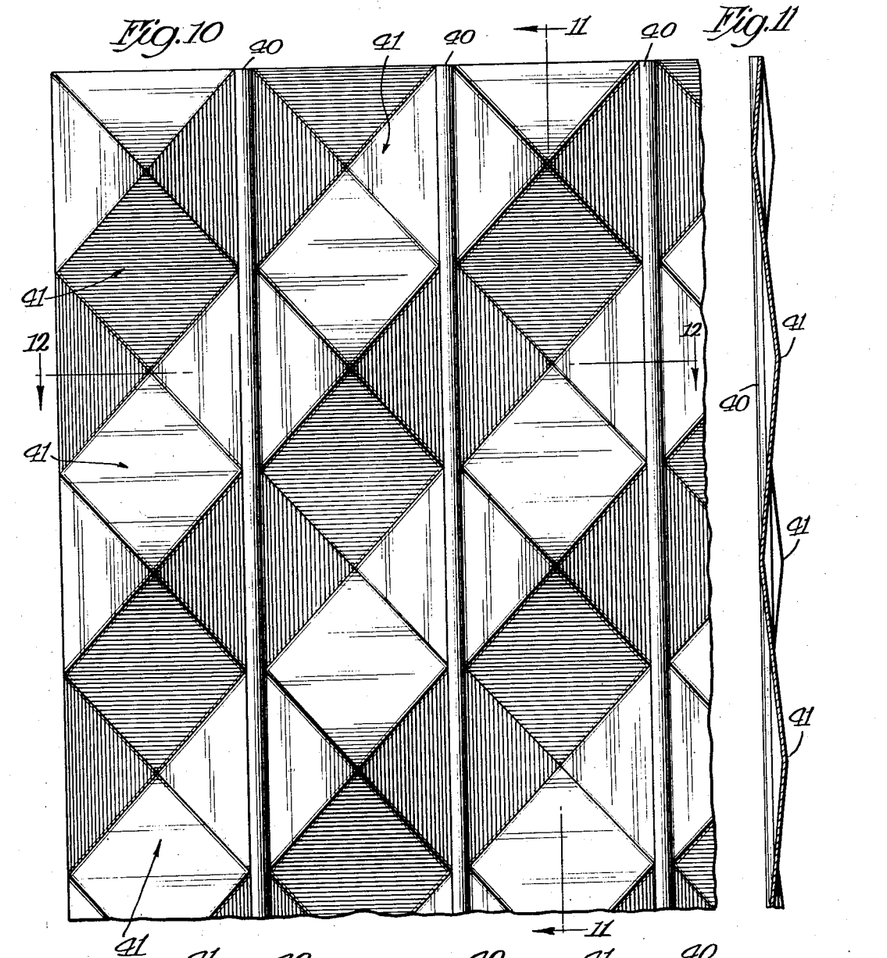
Fig. 10 is a fragmental plan view of another form of metallic sheet which I may employ in carrying out my invention.
Fig. 11 is a section taken substantially on line 11—11 of Fig. 10.
Figure 12:
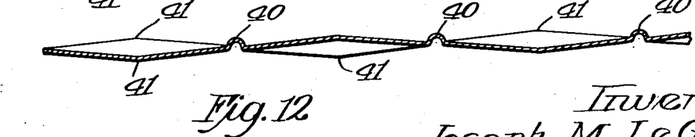
Fig. 12 is a section taken substantially on line 12—12 of Fig. 10.

In Figs. 10, 11, and 12, I show another form of sheet deformation which I have found to quite satisfactorily serve the purpose from the insulation, stiffening, etc., standpoints, already pointed out herein. This form of sheet may well be used in connection with insulation of refrigerator cars, cold storage vaults, buildings, and the like, where rather large sheets of material may be employed. More particularly, in this form, the sheet is provided with a plurality of ribs 40 and the surface of the sheet is deformed in such a way that reverse-diamond brakes or embossments 41 are formed thereon. In other words, adjacent brakes or embossments 41 extend in opposite directions toward opposite faces of the sheet. The ribs 40 are so located with respect to these embossments and the intersecting planes of adjacent brakes or embossments that they assume substantially the same position with respect to the intersecting planes as in the form of Figs. 1 to 7, inclusive; and these brakes or embossments and ribs function in substantially the same manner to provide increased insulation value, sheet stiffness, etc. as the prior-described form of sheets.

Figure 1:
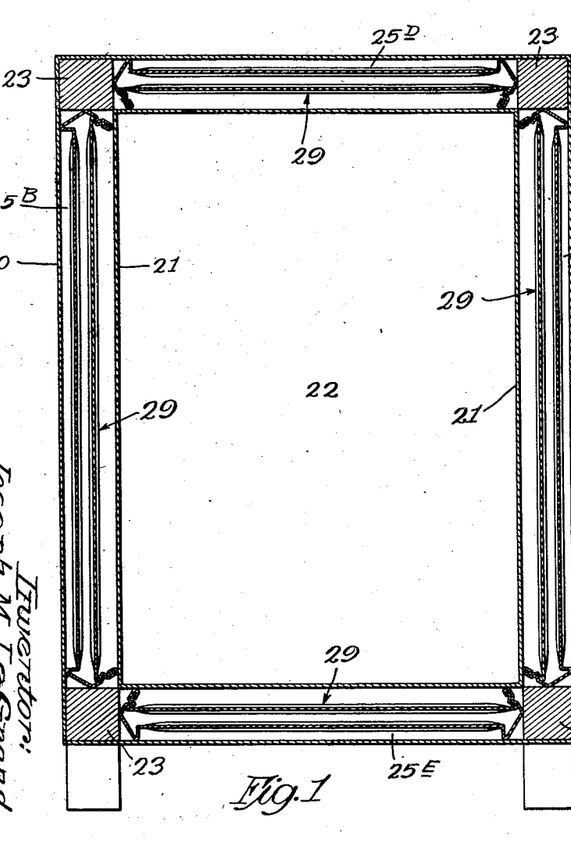
Figure 1 is a vertical sectional view through one form of household refrigerator cabinet thermally insulated according to my invention.
Figure 2:
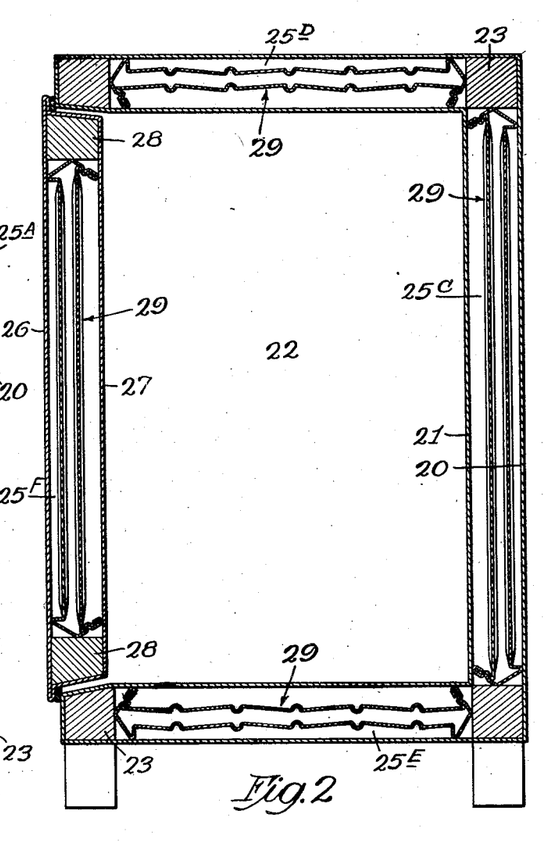
Fig. 2 is another vertical sectional view of the structure shown in Fig. 1, and taken substantially at right angles to that figure.
Figure 3:
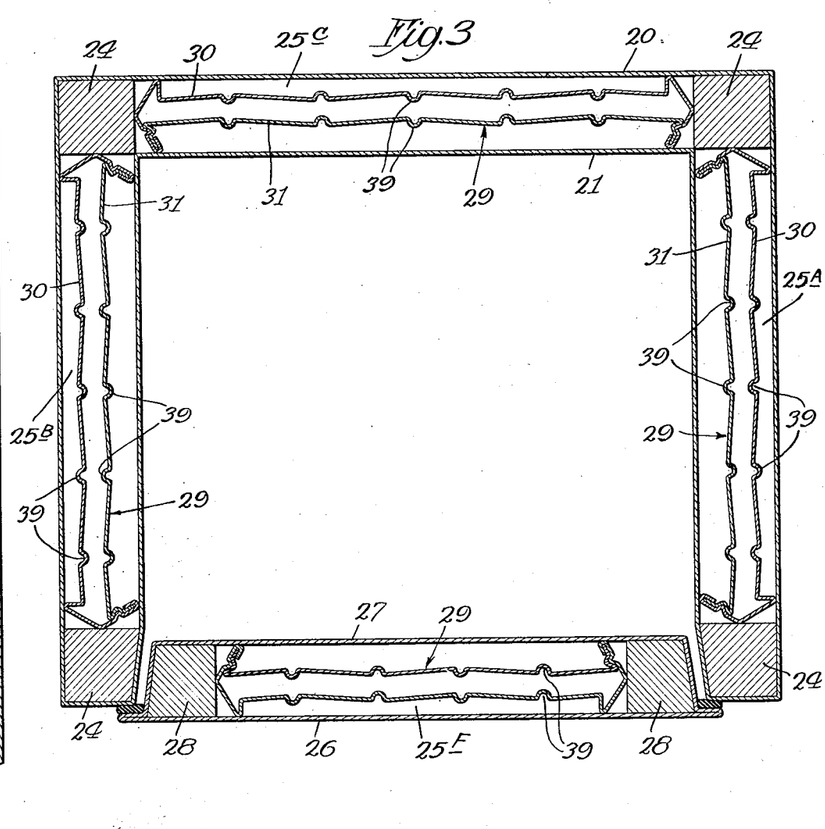
Fig. 3 is a slightly enlarged horizontal sectional view of the structure shown in Figs. 1 and 2.
Figure 4:
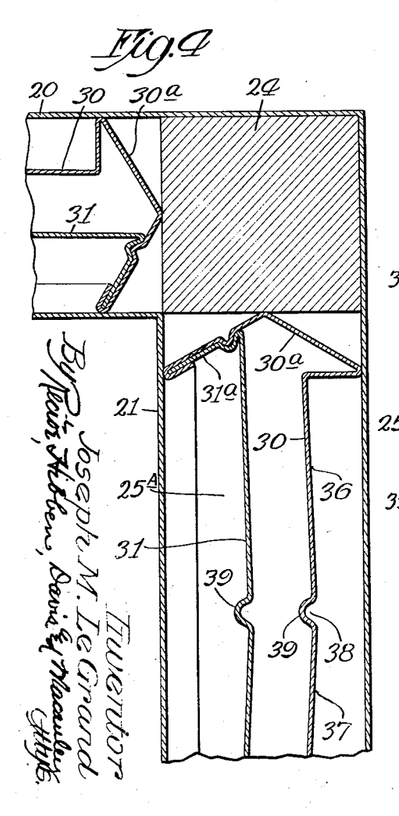
Fig. 4 is a still further enlarged fragmental view showing a corner section of the structure of Fig. 3.
Figures 8, 9:
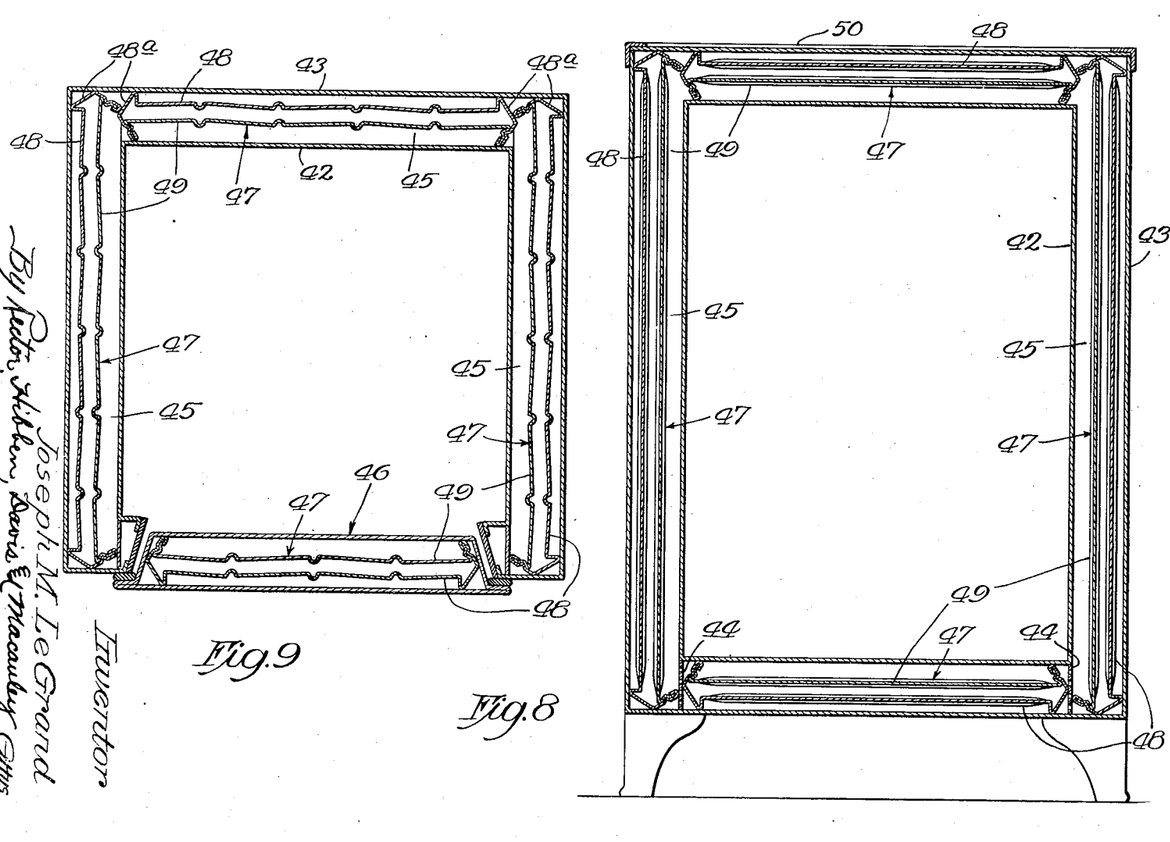
Fig. 8 is a vertical sectional view through another form of household refrigerator cabinet having my invention applied thereto.
Fig. 9 is a horizontal sectional view of the structure shown in Fig. 8.

In Figs. 8 and 9, I have illustrated my invention as applied to an all-metal refrigerator cabinet wherein the inner and outer shells 42 and 43 are supported in spaced relation by suitable leg members 44, without the use of vertical and horizontal frame members such as employed in the form of Figs. 1, 2 and 3. In this particular form, the space 45 between the shells 42 and 43 is continuous throughout the several walls of the refrigerator cabinet except for the door portion 46 thereof located at the front of the cabinet (Fig. 9). According to my invention, the film spaces between the metallic sheets of the insulating unit should be blanked off or sealed entirely around their edges so that there is no communication between the spaces on opposite sides of the sheets. Therefore, the unitary insulation structure which I employ and have described in connection with the form of Figs. 1 to 7, inclusive, is well adapted for structures of the character shown in Figs. 8 and 9. More particularly, I employ a plurality of insulating units 47 each of which is comprised of metallic sheets of substantially the same form as employed in the unit 29 (Fig. 5) previously described. In the forms shown in Figs. 8 and 9, each unit 47, like the previously described unit 29, comprises a supporting sheet 48 having its edge surfaces circumscribed by a mounting or edge seal head 48$^a$, and a second sheet 49 supported by the sheet 48. A unit of the foregoing character is disposed in the space 47 at each side of the refrigerator, at the top and bottom thereof, and also in the door space.

Support of these units is provided for as follows: The edge-seal head 48$^a$ of the adjacent units, at the corners of the space 45, are so related that they abut and find support upon each other in the manner clearly illustrated in Figs. 8 and 9. Thusly, the several units in the space 45 are electrically grounded upon each other and to the walls 42 and 43, and they are so related that the several spaces between the units 47 and the wall surfaces 42 and 43 defining the space 45 are completely closed or blocked off around the edges of the same. This is also true of the spaces between the sheets 48 and 49. Furthermore, the dimensions of the several units are such that the edge-seal portions 48ª of the same are forced or compressed into engagement with each other and the adjacent wall surfaces in such a way as to hold the several units in a predetermined poistion within the space 45 as in the form of Figs. 1 to 7, inclusive. This arrangement also facilitates the installation of the units, the top wall 50 (Fig. 8) of the cabinet being removably secured to the side walls to enable ready insertion of the units.

It will be understood that while I have shown and described a unitary insulation structure in connection with Figs. 8 and 9 which embodies two metallic sheets, such unit, dependent upon the space to be insulated, etc., may be only a single sheet having the edge supporting structure of sheet 48 so formed as to properly space such sheet with respect to the higher temperature side of the space in which it is located. Also, in case more than two sheets are desirable in the insulation unit, these sheets may be supported by one of the sheets in substantially the same manner as shown in Figs. 8 and 9. This is equally true with respect to the form of Figs. 1 to 7, inclusive, in case one or more than two sheets are employed in each unit.

I believe that the operation of my invention, as well as the several features and advantages thereof, will be understood from the foregoing. Complete blocking of heat transmission by radiation, conduction and convection is very closely approached by the use of one or more spaced metallic sheets which are of themselves high heat conductors. Insulation is accomplished by the utilization of a space of minimum depth and a heat conducting path of minimum length, thereby aiding in compactness of the structure insulated. Near-maximum thermal insulation may be had in practically every case where insulation is desired without cost prohibition. Insulation effected through the use of my invention, once established, is practically permanent since it is not subject to the deteriorating and disintegrating conditions to which prior known insulating materials and arrangements are subjected.

It will be understood that while I have shown and described a plurality of forms and adaptations of my invention, other arrangements and changes in details may be made without departing from the spirit and scope of my invention as defined by the claims which follow.

I claim:

1. A heat insulating structure which comprises a space defined by spaced walls adapted to be exposed to relatively higher and lower temperatures, a metallic sheet of sufficient thickness and stiffness to retain preformed shape mounted in said space, said sheet being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnet spectrum, and means for mounting said sheet in said space in spaced relation to said walls to provide substantially sealed air chambers substantially free from convection currents, said sheet being closer to the wall adapted to be exposed to the higher temperature.

2. A heat insulating structure which comprises a space defined by spaced walls adapted to be exposed to relatively higher and lower temperatures, a plurality of metallic sheets of sufficient thickness and stiffness to retain preformed shape mounted in said space, said sheets being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, and means for mounting said sheets in said space in spaced relation with respect to each other and to said walls to divide said space into a plurality of air chambers unobstructed throughout and substantially free from convection currents.

3. A heat insulating structure which comprises a space defined by spaced walls adapted to be exposed to relatively higher and lower temperatures, a single metallic sheet of sufficient thickness and stiffness to retain preformed shape mounted in said space, said sheet being preformed to divide its surface into a plurality of angular and intersecting plane surfaces, and means for mounting said sheet in said space in spaced relation to said walls and closer to the higher temperature wall than to the lower temperature wall.

4. A heat insulating structure which comprises a space defined by spaced walls adapted to be exposed to relatively higher and lower temperatures, a plurality of metallic sheets of sufficient thickness and stiffness to retain preformed shape mounted in said space, said sheets being preformed to divide each of their surfaces into a plurality of angular and intersecting plane surfaces, and means for mounting said sheets in said space in spaced relation to said walls and with the central plane of the group of said sheets closer to the higher temperature wall than to the lower temperature wall.

5. A heat insulating structure which comprises a space defined by spaced walls adapted to be exposed to relatively higher and lower temperatures, a metallic sheet of sufficient thickness and stiffness to retain preformed shape mounted in said space in spaced relation to said walls and being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, said sheet being preformed to divide its surface into a plurality of angular and intersecting planes, and means for mounting said sheet in said space in said spaced relation.

6. A heat insulating structure which comprises a space defined by spaced walls adapted to be exposed to relatively higher and lower temperatures, a plurality of metallic sheets of sufficient thickness and stiffness to retain preformed shape mounted in said space in spaced relation to each other and to said walls and being formed of a material possessing relatively low reflective characteristics when exposed to radiation of wave lengths within the visible portion of the electro-magnetic spectrum and relatively high reflective characteristics when exposed to radiation of longer wave lengths than the visible portion of the electromagnetic spectrum, said sheets being preformed to divide their surfaces into a plurality of angular and intersecting planes, and means for mounting said sheets in said space in said spaced relation.

7. In an insulating structure for insulating a space defined by spaced wall surfaces adapted to be exposed externally to relatively higher and lower temperature areas, a metallic sheet of sufficient thickness and stiffness to retain preformed shape mounted in said space and being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, and means for mounting said sheet in said space at a point whereby said sheet is spaced from the higher temperature wall surface a distance which falls within the dimensional limits of less than one-half and more than one-third of the distance between said space-defining wall surfaces.

8. In an insulating structure for insulating a space defined by spaced wall surfaces adapted to be exposed externally to relatively higher and lower temperature areas, a plurality of spaced metallic sheets of sufficient thickness and stiffness to retain a comparatively rigid form mounted in said space, said sheets being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, and means for mounting said sheets in such relative positions in said space that the central plane of the group of said plates is spaced from the higher temperature wall surface a distance which falls within the dimensional limits of less than one-half and more than one-third of the distance between said space-defining wall surfaces.

9. In an insulating structure for insulating a space defined by spaced wall surfaces adapted to be exposed externally to relatively higher and lower temperature areas, a metallic sheet normally of sufficient thickness and stiffness to retain preformed shape mounted in and extending throughout the length and width of said space dividing the latter into a plurality of disconnected air spaces, said sheet being preformed to divide its surface into a series of angular and intersecting planes, and means for mounting said sheet at such a position in said space that said sheet is spaced from the higher temperature wall surface a distance which falls within the dimensional limits of less than one-half and more than one-third of the distance between said space-defining wall surfaces.

10. In an insulating structure for insulating a space defined by spaced wall surfaces adapted to be exposed externally to relatively higher and lower temperature areas, a plurality of spaced metallic sheets of sufficient thickness and stiffness to retain a comparatively rigid form mounted in said space in spaced relation to said wall surfaces, each said sheet extending throughout the plane of said space and defining a plurality of disconnected air spaces, and said sheets having their surfaces preformed to provide a plurality of angular and intersecting planes therein, and means for mounting said plates in said space at such relative positions therein that the central plane of the group of said plates is spaced from the higher temperature wall surface a distance which falls within the dimensional limits of less than one-half and more than one-third of the distance between said space-defining wall surfaces.

11. A heat insulating structure which comprises a space defined by spaced walls adapted to be exposed to relatively higher and lower temperatures, a plurality of metallic sheets mounted in said space and being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, said sheets being preformed to divide each of their surfaces into a plurality of angular and intersecting plane surfaces, and means for mounting said sheets in said space in spaced relation to each other and to said walls with the central plane of the group of said sheets closer to the higher temperature wall than to the lower temperature wall, and for electrically grounding said sheets to each other.

12. In a heat insulating structure for insulating a space defined by wall surfaces adapted to be exposed externally to relatively higher and lower temperature areas, said space, when subjected to a predetermined temperature condition, having its thermal fulcrum point located at a predetermined position therein, a metallic sheet possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum disposed within and extending throughout the length and width of said space in spaced relation to said wall surfaces, said sheet being so positioned in said space that, when the structure is employed under said predetermined temperature condition, said sheet is located approximately on said predetermined fulcrum point.

13. In a heat insulating structure for insulating a space defined by wall surfaces adapted to be exposed externally to relatively higher and lower temperature areas, said space, when subjected to a predetermined temperature condition, having its thermal fulcrum point located at a predetermined position therein, a plurality of metallic sheets possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum disposed within said space in spaced relation to each other and to said wall surfaces, each of said sheets extending throughout the length and width of said space, the central plane of the group of said plates being so positioned in said space that, when the structure is employed under said temperature condition said central plane is located approximately on said predetermined fulcrum point.

14. The process of thermally insulating a space between two walls which consists in providing a sheet of metal possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, determining the thermal fulcrum point in said space for a certain mean temperature difference, and mounting said metallic sheet on said predetermined fulcrum point and substantially parallel to said walls.

15. The process of thermally insulating a space between two walls which consists in providing a plurality of sheets of metal each of a character possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, determining the thermal fulcrum point in said space when used under temperature conditions establishing a certain mean temperature difference, arranging said plates in group form in spaced relation with respect to each other, determining the position of the central plane of said group of plates, and mounting said group of plates in said space in spaced relation to said walls and with the central plane of said group on said predetermined fulcrum point and substantially paralel to said walls.

16. A refrigerator cabinet which comprises a plurality of walls defining a refrigerator compartment adapted to be maintained at a lower temperature than the temperature of the environment in which said cabinet is located, said walls each being formed of a pair of spaced members defining in each wall a separate and enclosed space, and means for insulating said walls against the flow of heat therethrough by radiation, conduction and convection which comprises a metallic sheet disposed in each said wall space substantially parallel with the space-defining walls thereof, said sheet dividing said space into a plurality of disconnected air chambers each disposed in a single plane, and each said sheet being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum.

17. A refrigerator cabinet which comprises a plurality of walls defining a refrigerator compartment adapted to be maintained at a lower temperature than the temperature of the environment in which said cabinet is located, said walls each being formed of a pair of spaced members defining in each wall a separate and enclosed space, and means for insulating said walls against the flow of heat therethrough by radiation, conduction and convection which comprises a plurality of metallic sheets spaced from each other and disposed in each said wall space substantially parallel with and in spaced relation to the space-defining walls thereof, said sheets dividing said space into a plurality of disconnected air chambers each disposed in a single plane, and said sheets being formed of a material possessing relatively low reflective characteristics when exposed to radiation of wave lengths within the visible portion of the electromagnetic spectrum and relatively high reflective characteristics when exposed to radiation of longer wave lengths than the visible portion of the electromagnetic spectrum.

18. In structure of the class described, spaced wall surfaces defining a space to be thermally insulated, and a metallic sheet for establishing insulation effects which comprises a plane body portion, edge seal means around the edges of said body portion adapted to engage said wall surfaces and to yield laterally and in the plane of said sheet for yieldably supporting the sheet in position in said space.

19. An insulating unit for a system of the class described which comprises a metallic sheet having a body portion, laterally projecting seal means around the edges of said body adapted to yieldably engage the walls of the space to be insulated for supporting the sheet in its normal position in said space and for sealing one side of said body from the other side, and another metallic sheet supported by and nested within the edge seal means of said first sheet in spaced relation to said first sheet, said edge seal means electrically grounding said sheets.

20. An insulating unit for a system of the class described which comprises a metallic sheet having a body portion, a laterally extending flange around the edges of said body, and a triangularly-shaped edge seal means supported by and extending substantially throughout the perimeter of said flange, said edge seal means being adapted to engage wall surfaces defining a space to be insulated and to yield in the plane of said body portion and laterally thereof.

21. An insulating unit for a system of the class described which comprises a metallic sheet having a body portion, a laterally extending flange around the edges of said body, a triangularly-shaped edge seal means supported by said flange and adapted to engage wall surfaces defining a space to be insulated and to yield in the plane of said body portion and laterally thereof, and at least one other metallic sheet supported by said edge seal means in spaced relation to the body portion of said first sheet.

22. A thermal insulating structure which comprises spaced wall surfaces defining a uni-planar air space, a metallic sheet normally of sufficient thickness and stiffness to retain preformed shape mounted in said space and of sufficient dimensions to extend throughout the length and width thereof to divide said air space into a plurality of uni-planar and substantially sealed air chambers substantially free from convection currents, and means for mounting said sheet in such a position in said space that said air chambers are each of substantially uniform depth throughout and said sheet is spaced from the higher temperature wall surface a distance which falls within the dimensional limits of less than one-half and more than one-third of the distance between said space-defining wall surfaces.

23. An insulating structure for insulating a uni-planar space defined by spaced wall surfaces adapted to be exposed externally to relatively higher and lower temperature areas, which includes a plurality of spaced metallic sheets of sufficient thickness and stiffness to retain preformed shape mounted in said space and of sufficient dimensions to extend throughout the length and width of said space dividing the latter into a plurality of uni-planar and substantially sealed air chambers each of substantially uniform depth throughout and substantially free from convection currents, and means for mounting said sheets at such a position in said space that they are spaced from said wall surfaces and the central plane of the group of sheets is spaced from the higher temperature wall surface a distance which falls within the dimensional limits of less than one-half and more than one-third of the distance between said space-defining wall surfaces.

24. A unitary heat insulating structure which comprises spaced wall surfaces defining an enclosed uni-planar space, at least one metallic sheet of sufficient thickness and stiffness to retain preformed shape mounted in said space, said sheet being formed of a comparatively hard and smooth-surfaced material which is of a relatively non-bright character as compared to tin, aluminum and other silver-like surfaces, and means associated with the edges of said sheet for mounting the same in said space in spaced relation to said wall surfaces to divide said space into a plurality of uni-planar substantially sealed subspaces unobstructed throughout the plane thereof.

25. A heat insulating structure adapted to thermally insulate a single-plane space defined by spaced and substantially parallel wall surfaces adapted to be exposed to relatively higher and lower temperatures, which comprises a plurality of spaced metallic sheets of sufficient thickness and stiffness to retain preformed shape and of sufficient size to extend throughout the length and width of said space, said sheets being formed of a comparatively hard surfaced material, of a relatively non-bright character as compared to tin, aluminum and other silver-like surfaces, and means for mounting said sheets in said space in spaced relation with respect to each other and to said wall surfaces to divide said space into a plurality of disconnected, single-plane sub-spaces.

26. A unitary heat insulating structure adapted to be readily applied to and removed from a space to be insulated, which comprises a plurality of spaced metallic sheets mounted in and dividing said space into a plurality of disconnected and substantially sealed air chambers which are unobstructed throughout the length and width thereof, said sheets being formed of a relatively hard and smooth-surfaced material possessing relatively low reflective characteristics when exposed to radiation of wave lengths within the visible portion of the electro-magnetic spectrum and relatively high reflective characteristics when exposed to radiation of longer wave lengths than the visible portion of the electro-magnetic spectrum, and means for mounting said sheets in said space in spaced relation to each other.

27. A heat insulating structure which comprises spaced wall members defining a space, a sheet of commercial steel possessing relatively higher reflective characteristics when exposed to radiation of wave lengths longer than those of the visible portion of the electro-magnetic spectrum mounted in said space and of sufficient dimensions to divide said space into disconnected sub-spaces, and means for mounting said sheet in said space spaced from wall members.

28. A heat insulating structure which comprises spaced wall members defining a space, a plurality of steel sheets of a character adapted to increase in reflective ability as they are exposed to radiation of wave lengths longer than the wave lengths of visible light, and means for mounting said sheets in said space in spaced relation to each other and to said wall members to divide said space into a plurality of disconnected sub-spaces.

29. A heat insulating structure which comprises spaced walls adapted to be disposed adjacent relatively higher and lower temperature areas, a plurality of spaced metallic sheets mounted in said space, said sheets being formed of a comparatively hard and smooth-surfaced commercial steel possessing relatively low reflective characteristics when exposed to radiation of wave lengths within the visible portion of the electro-magnetic spectrum and relatively high reflective characteristics when exposed to radiation of longer wave lengths than the visible portion of the electro-magnetic spectrum, and means for mounting said sheets in said space in such spaced relation that the central plane thereof is located closer to the one of said walls which is disposed adjacent to the higher temperature area.

30. A heat insulating structure which comprises spaced walls defining a space, at least one metallic sheet of a character adapted to retain preformed shape, said sheet being preformed to divide its surface into a plurality of angular and intersecting planes, said sheet being also preformed to provide therein ribs located along the points of intersection of said planes, and means for mounting said sheet in said space in spaced relation to said walls.

31. A heat insulating structure which comprises spaced wall surfaces defining a space, a plurality of metallic sheets mounted in said space and formed of a material adapted to retain preformed shape, each of said sheets being preformed to divide their surfaces into a plurality of angular and intersecting planes, said sheets being arranged in said space in such a manner that opposed plane surfaces of adjacent sheets are substantially parallel to each other whereby said sheets are spaced substantially equi-distant throughout, and means for mounting said sheets in said space in spaced relation to each other and to said wall surfaces.

32. In an insulating structure for insulating a space defined by spaced wall surfaces adapted to be exposed externally to relatively higher and lower temperature areas, a plurality of spaced metallic sheets of sufficient thickness and stiffness to retain a comparatively rigid form mounted in said space to divide the latter into a plurality of substantially sealed air chambers substantially free from convection currents, said sheets being formed of commercial steel possessing relatively low reflective characteristics when exposed to radiation of wave lengths within the visible portion of the electro-magnetic spectrum and relatively high reflective characteristics when exposed to radiation of longer wave lengths than the visible portion of the electro-magnetic spectrum, and means for mounting said sheets in such relative positions in said space that the central plane of the group of said plates is spaced from the higher temperature wall surface a distance which falls within the dimensional limits of less than one-half and more than one-third of the distance between said space-defining wall surfaces.

33. A heat insulating unit adapted to be inserted in a closed space defined by spaced walls of the structure to be insulated, which comprises a plurality of commercial steel sheets preformed to divide their surfaces into a plurality of angular and intersecting planes extending across the sheets in one direction and to provide ribs at the intersection of said planes, the sheets being spaced apart in parallelism and arranged so that their planes and ribs are in alignment.

34. A heat insulating structure which comprises spaced wall surfaces defining a space and adapted to be disposed adjacent relatively higher and lower temperature areas, means dividing said space into a plurality of disconnected and substantially sealed air chambers substantially free from convection currents, which includes a plurality of spaced sheets extending substantially throughout the length and width of said space, said sheets having their surfaces exposed to said air chambers formed of a comparatively hard and smooth-surfaced ferrous metallic material possessing relatively low reflective characteristics when exposed to radiation of wave lengths within the visible portion of the electro-magnetic spectrum and relatively high reflective characteristics when exposed to radiation of longer wave lengths than the visible portion of the electro-magnetic spectrum, and means for mounting said sheets in said space in spaced relation to each other and to said walls.

In testimony whereof, I have subscribed my name.

JOSEPH M. LE GRAND.